(12) United States Patent
Gilles et al.

(10) Patent No.: US 9,555,761 B2
(45) Date of Patent: Jan. 31, 2017

(54) INFLATABLE CURTAIN AIRBAG ASSEMBLY

(71) Applicant: Autoliv Development AB, Vargarda (SE)

(72) Inventors: Garett Gilles, Rouen (FR); Dana Wold, Farmington Hills, MI (US); John F. Witt, Clinton Township, MI (US)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/762,385

(22) PCT Filed: Feb. 5, 2014

(86) PCT No.: PCT/EP2014/000300
§ 371 (c)(1),
(2) Date: Jul. 21, 2015

(87) PCT Pub. No.: WO2014/121920
PCT Pub. Date: Aug. 14, 2014

(65) Prior Publication Data
US 2015/0367810 A1    Dec. 24, 2015

(30) Foreign Application Priority Data
Feb. 5, 2013  (DE) .................. 10 2013 201 880

(51) Int. Cl.
*B60R 21/213*  (2011.01)
*B60R 21/201*  (2011.01)
*B60R 21/232*  (2011.01)
*B60R 21/2334* (2011.01)

(52) U.S. Cl.
CPC .......... *B60R 21/213* (2013.01); *B60R 21/201* (2013.01); *B60R 21/232* (2013.01); *B60R 21/2334* (2013.01)

(58) Field of Classification Search
CPC combination set(s) only.
See application file for complete search history.

(56) References Cited

U.S. PATENT DOCUMENTS 7,159,896 B2 *  1/2007  Ochiai ................. B60R 21/201
                                              280/730.2
7,328,911 B2 *  2/2008  Chapman ............... B60R 21/20
                                              280/728.2
7,748,734 B2 *  7/2010  Wilmot ................ B60R 21/201
                                              280/728.2
(Continued)

FOREIGN PATENT DOCUMENTS

WO    WO-2011/037198    3/2011

OTHER PUBLICATIONS

International Search Report for PCT/EP2014/000300, ISA/EP, Rijswijk, NL, mailed Apr. 4, 2014.

*Primary Examiner* — Nicole Verley
(74) *Attorney, Agent, or Firm* — Stephen T. Olson; Harness, Dickey & Pierce, P.L.C.

(57) ABSTRACT

An inflatable curtain airbag assembly has a tubular rolled or folded curtain airbag, and at least one stiffening member provided at the tubular rolled or folded curtain airbag. The stiffening member is fixed by an adhesive connection, a sewing connection, a welding connection or a melting connection directly to the curtain airbag.

17 Claims, 2 Drawing Sheets

(56) References Cited

U.S. PATENT DOCUMENTS

| | | | | |
|---|---|---|---|---|
| 8,157,290 B2* | 4/2012 | Kjell | ................... | B60R 21/232 |
| | | | | 280/730.2 |
| 8,876,150 B2* | 11/2014 | Min | ................... | B60R 21/232 |
| | | | | 280/728.2 |
| 9,139,151 B2* | 9/2015 | Beppu | ................... | B60R 21/213 |
| 2005/0057023 A1* | 3/2005 | Burton | ................ | B60R 21/232 |
| | | | | 280/730.2 |
| 2005/0206135 A1* | 9/2005 | Nelson | ................ | B60R 21/232 |
| | | | | 280/728.2 |
| 2009/0091105 A1* | 4/2009 | Okimoto | ............... | B60R 21/213 |
| | | | | 280/728.3 |
| 2011/0057422 A1 | 3/2011 | Cheal et al. | | |

* cited by examiner

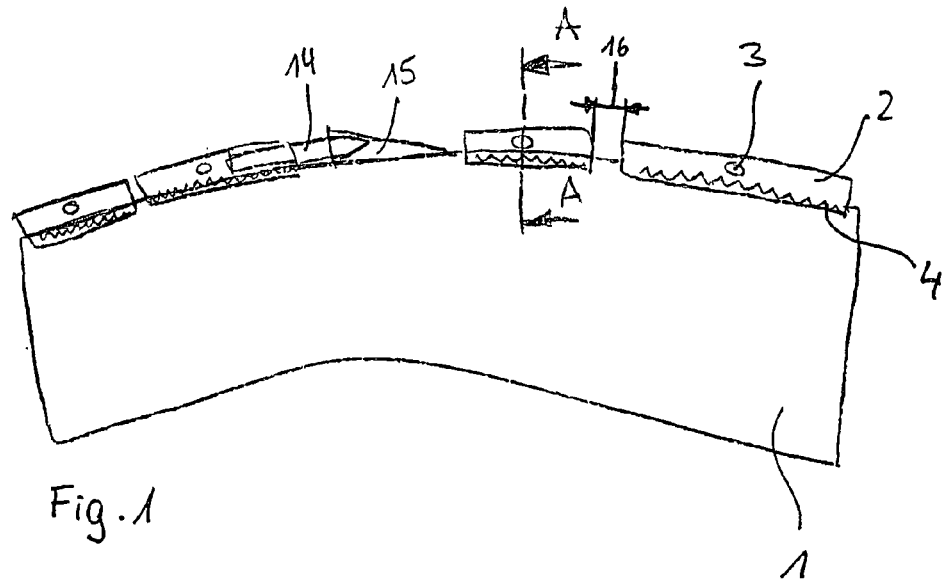
Fig. 1
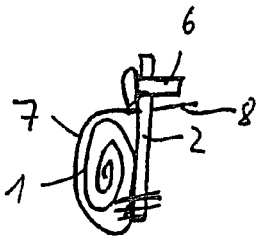
Fig. 4
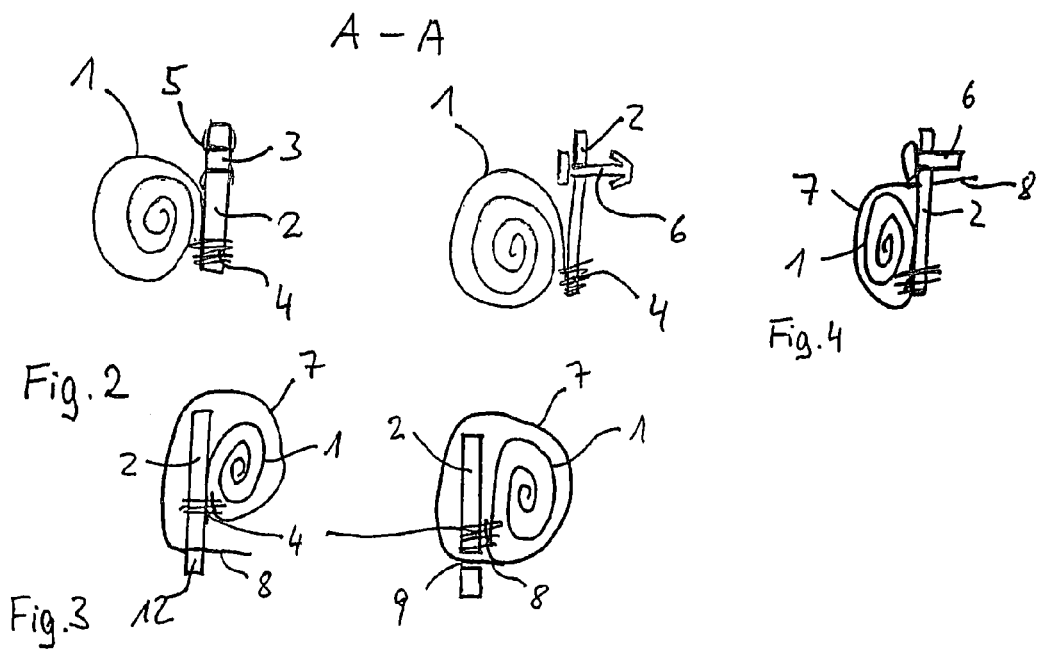
Fig. 2
Fig. 3

INFLATABLE CURTAIN AIRBAG ASSEMBLY

CROSS-REFERENCE TO RELATED APPLICATIONS

This application is a 371 U.S. National Stage of International Application No. PCT/EP2013/000300, filed Feb. 5, 2014. This application claims priority to and the benefit of German Patent Application No. 10 2013 201 880.0, filed Feb. 5, 2013. The disclosures of the above applications are incorporated herein by reference.

FIELD

The invention relates to an inflatable curtain airbag assembly comprising the features of the preamble of claim 1.

BACKGROUND

The inflatable curtain airbag is a special airbag, which is arranged at the upper side rim of the interior roof structure of the vehicle. The purpose of the inflatable curtain is especially the protection of the occupant in case of a side impact and to prevent the occupant from hitting onto the interior side structure or from moving out of an open window.

The inflatable curtain airbag itself may have a length in length direction of the vehicle from 1.00 m to more than 2.5 m. In the inflated status the curtain airbag extends downwards from the roof structure up to an upper rim of the door structure. The curtain airbag is rolled or folded to a tube and mounted under the roof lining together with a gas generator which inflates the curtain airbag by generating a certain gas flow within a short time when activated.

One general problem of curtain airbags to be solved is that the curtain airbag must not be twisted when being mounted at the vehicle structure. To prevent the twisting of the curtain airbag it is known from the US 2005/0057023 A1 to provide the curtain airbag with at least one stiffening member. The stiffening member is made of a plastic beam which extends along at least a portion of the longitudinal length of the rolled or folded curtain airbag. The stiffening member itself is fixed to the curtain airbag via separate attachment tabs.

SUMMARY

In view of this prior art it is the object of the invention to provide a cost-effective inflatable curtain airbag assembly with at least one stiffening member to prevent a twisting of the curtain airbag when being mounted at the vehicle structure.

According to the inventive idea it is suggested that the stiffening member is fixed by an adhesive connection, a sewing connection or a melting connection directly to the airbag fabric. The advantage of the suggested solution is that the stiffening member does not need to be fixed by an extra part, so that the manufacturing costs and especially the assembly costs may be reduced. Furthermore the stiffening member is arranged in a fixed position at the curtain airbag and may not move out of this position during transportation or during the handling of the curtain airbag when mounting the same at the vehicle structure.

Furthermore it is suggested that the stiffening member is designed at least in one section with a height perpendicular to the length direction of the tubular rolled or folded airbag which is greater than the diameter of the tubular rolled or folded curtain airbag. The stiffening member provides therefore a supporting structure for the rolled or folded curtain airbag with a sufficient surface. Furthermore the curtain airbag is therefore not only supported but also protected by the stiffening member against external mechanical influences.

Another preferred embodiment can be provided when a wrapper is provided, which is attached with two side rims at the stiffening member. The stiffening member acts in this case also as a supporting element for the wrapper, which fixes the curtain airbag in the tubular shape. The wrapper may be fixed at the stiffening member or at the curtain airbag by using the same connection for example a stitching which is used to attach the stiffening member at the airbag fabric.

The wrapper may press the tubular rolled or folded curtain airbag in another preferred embodiment in an oval-shaped cross section. The oval cross section is so far advantageous as the thickness of the whole unit may be thereby reduced. Furthermore the curtain airbag is abutting with a greater surface at the stiffening member, so that the whole unit got a higher stiffness especially with respect to a torsion force acting around the length axis of the longitudinal inflatable curtain airbag assembly.

The wrapper can be fixed in a very easy and cost-effective manner when the stiffening member is provided with at least one protruding section to which the wrapper is fixed. The wrapper can comprise one or more openings in the free side rim, through which the protruding section is inserted to fix the wrapper with the free side rim.

Furthermore it is suggested that at least one of the stiffening members protrudes the rolled or folded curtain airbag, and that in the protruding section an attachment section is provided for fixing the curtain airbag assembly at an interior vehicle structure. The stiffening member can be used thereby also to fix the curtain airbag at the vehicle structure so that extra lugs or tabs to fix the curtain airbag like used in known embodiments, in the prior art, are not necessary anymore. Furthermore the stiffening member has a high stiffness, so that the arrangement of the stiffening member defines also the mounting direction. For mounting the curtain airbag in a wrong orientation the curtain airbag needs to be twisted or bended especially in the sections of the attachment which are stiffened by the stiffening members, so that the risk of a mounting in a wrong orientation is reduced.

Furthermore it is suggested that the stiffening member is made as a molded plastic part, and comprises an integrated molded fastener. The molding process itself enables also a complex shaping of the stiffening member, so that the fastener can be integrated by designing the stiffening member in a special shape. The fastener may be for example a hook or a pin to be inserted in a corresponding opening in the vehicle structure.

Furthermore it is suggested that two protruding sections in form of two projecting fingers are provided, which are arranged in a distance to each other, and the protrusion for fixing the inflatable curtain airbag assembly at an interior vehicle structure is arranged between the projecting fingers. The stiffening member can be used to fix the wrapper and also to fix the curtain airbag with a very easy design. As the wrapper is supported to both sides by the protruding section arranged between the projecting fingers, the wrapper is also secured by the protruding section against a sidewise movement on the curtain airbag. The stiffening member may also have several groups of projecting fingers and protrusions if the stiffening member is fixed at several attachment points at the vehicle structure.

Furthermore it is suggested that several stiffening members are provided which are arranged in a distance to each other, which is smaller than 120% of the circumference or perimeter of a cross-section of the rolled or folded tubular curtain-airbag 1. By the suggested arrangement it can be prevented that the curtain airbag is twisted in the area between the stiffening members to one or more revolutions around its length axis.

A very cost-effective solution can be realized when the stiffening member is made of a plastic tab having a thickness of at least 0.5 mm. The plastic tab with its suggested thickness does comprise the necessary stiffness, wherein the suggested thickness also enables a sewing connection with the airbag fabric. Furthermore the connection can also be realized by melting the plastic material or it can be an adhesive connection or a welding connection adapted to the plastic material. The stiffening member may also have a varying thickness with a minimum thickness of 0.5 mm. Some areas like for example the attachment section for fixing the curtain airbag at the vehicle structure can be designed with a greater thickness of for example 2.0 mm, while other sections need to be more flexible and have only a thickness of 0.5 to 1.0 mm. Using special lines with a lower thickness it is also possible to provide a flexibility in special orientations.

DESCRIPTION OF THE DRAWINGS

In the following the invention shall be illustrated on the basis of preferred embodiments with reference to the accompanying drawings, wherein:

FIG. 1 shows an inflatable curtain airbag assembly with an unrolled or unfolded curtain airbag, and FIG. 2 shows the curtain airbag cross section along the cutting line A-A in FIG. 1, and FIG. 3 shows the curtain airbag in a cross section through a stiffening member with a wrapper, and FIG. 4: shows a curtain airbag in a cross section with one stiffening member for fixing a wrapper and also for fixing the assembly unit at the vehicle structure.

DETAILED DESCRIPTION

Figure 5:
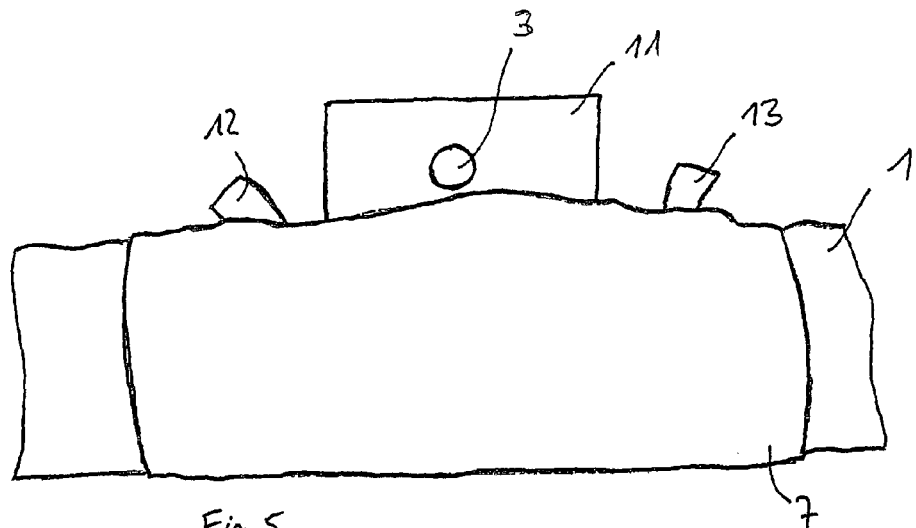
FIG. 5: shows a cut-out of the front side view of the inflatable curtain airbag assembly.

In FIG. 1 it is shown an inflatable curtain airbag assembly with an unrolled curtain airbag 1. The curtain airbag 1 is made of a fabric and comprises several not shown chambers. The total length of the curtain airbag 1 may be 1.5 to 2.5 m depending on the vehicle and the height may be approximately 0.4 to 1.2 m. At the top rim of the curtain airbag several stiffening members 2 are provided which are directly connected via a sewing connection 4 to the fabric of the curtain airbag 1.

The stiffening members 2 are sewn in a lower section with the fabric and are dimensioned with a height, so that they are protruding the upper rim of the fabric. In FIGS. 2 and 3 it is shown the inflatable curtain airbag assembly in view to the cross section A-A with a rolled or folded curtain airbag 1 in different embodiments. Furthermore a gas generator 14 is provided which is inserted in an inlet section 15 of the curtain airbag 1.

In FIG. 2 the stiffening member 2 protrudes the rolled or folded tube of the curtain airbag 1 at the top. The stiffening member 2 further comprises an attachment opening 3, which is covered by an inlet 5 for a screw. The stiffening member 2 supports the rolled or folded tube of the curtain airbag 1 at the backside and is directly attached to the fabric of the curtain airbag 1 by a sewing connection 4. In an alternative embodiment also a T-clip 6 may be used to fix the stiffening member 2 at a vehicle structure. Alternatively also bolts, studs, rivets, push-pins or other fasteners to pass through may be used instead of the T-clip 6. As the stiffening member 2 is made as a molded plastic part it is also possible to integrate the fastener in the stiffening member 2 by molding the fastener into the design of the stiffening member 2, so that the fastener and the stiffening member 2 are made as one piece.

In FIG. 3 another alternative embodiment of the invention is shown, where the stiffening member 2 protrudes the rolled or folded curtain airbag 1 at the lower rim. Furthermore a wrapper 7 is provided, which is attached via the same sewing connection 4 to the fabric of the curtain airbag 1 and the stiffening member 2. The wrapper 7 is looped around the tubular rolled or folded curtain airbag 1 and the stiffening member 2 and is finally fixed with the free rim 8 at a projecting finger 12 of the stiffening member 2. The free rim 8 may be also fixed in an opening 9 of the stiffening member 2. Thereby the rolled or folded tubular curtain airbag 1 is additionally fixed in the rolled or folded status at the stiffening member 2. As the stiffening member 2 comprises a height in direction of the shown cross section which is greater than the diameter of the rolled or folded curtain airbag 1 the wrapper 7 may compress the rolled or folded curtain airbag 1 to an oval cross section, which means that the thickness of the whole assembly unit in a direction perpendicular to the plane of the stiffening member 2 can be reduced. This reduced thickness may be reasonable for example to mount the assembly unit in very flat installation spaces.

The stiffening member 2 may be shaped as a rectangular flat sheet made out of a plastic, like PA 6, with the opening 3 in a top section. The sections of the protruding section beside the opening 3 can be used as grab handles when mounting the inflatable curtain airbag assembly at the vehicle structure.

In FIG. 4 it is shown another alternative embodiment where the stiffening member 2 is used for fixing the whole unit at the vehicles structure and also for fixing a wrapper 7, which fixes the curtain airbag 1 in the rolled or folded tubular shape.

Figure 6:
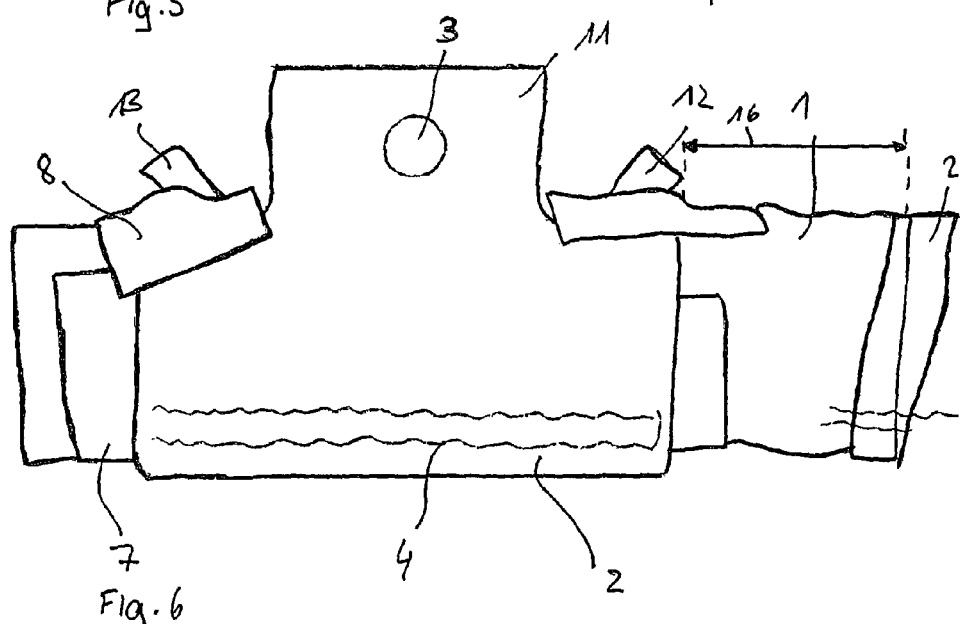
FIG. 6: shows a cut-out of the rear side view of the inflatable curtain airbag assembly.

In FIG. 5 it is shown a cut-out of a front view and in FIG. 6 it is shown a cut-out of a rear view of the inflatable curtain airbag assembly.

The stiffening member 2 is sewn via a sewing connection 4 in the lower section together with a wrapper 7 to the fabric of the curtain airbag 1. The stiffening member 2 further comprises a protrusion 11 with the opening 3 which protrudes the upper rim of the curtain airbag 1. The stiffening member 2 is further provided beside the protrusion 11 with two upwardly directed projecting fingers 12 and 13 to which the wrapper 7 is fixed with the fee rim 8. The inflatable curtain airbag assembly is fixed at the vehicle structure by a screw or clip inserted into the opening 3 and fixed at the vehicle structure. The stiffening member 2 is used not only to prevent the twisting of the tubular rolled or folded curtain airbag 1 but also to fix the wrapper 7 and to fix the whole unit at the vehicle structure. Therefore previously used extra tabs or lugs at the curtain airbag 1 are not needed any more to fulfill these functions, so that the costs for manufacturing and assembling of the inflatable curtain airbag assembly may be reduced. The protrusion 11 and the projecting fingers 12 and 13 are protruding sections of the stiffening member 2, which protrudes the upper rim of the tubular rolled or folded curtain airbag 1, when the stiffening member 2 is fixed. When the curtain airbag 1 is mounted in a P-roll-shape, the protrusion 11 of the stiffening member 2 would be located underneath the rolled curtain airbag 1 and directed downwards.

Furthermore several stiffening members 2 are provided which are arranged in a distance 16, which is smaller than the diameter of the tubular rolled or folded curtain airbag 1. This small distance 16 prevents a twisting of the curtain airbag 1 between the stiffening members 2. The stiffening members 2 are sewn in a non-inflatable area of the curtain airbag 1, so that the inflation characteristic is not influenced by the fixed stiffening members 2.

Figure 7:
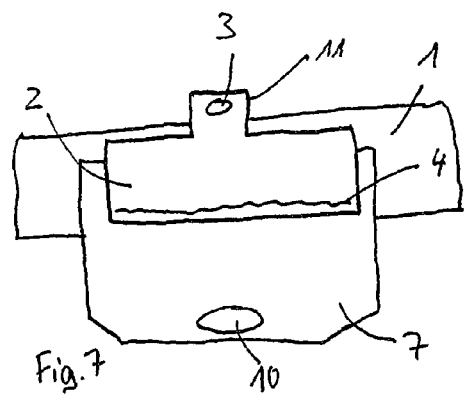
FIG. 7: shows the same cut out like shown FIG. 6 with stiffening member with a wrapper before the fixation.
Figure 8:
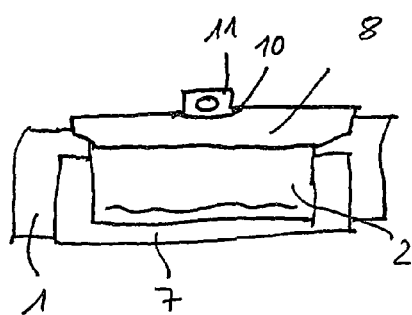
FIG. 8: shows the embodiment from FIG. 7 with a fixed wrapper.

In the FIGS. 7 and 8 another alternative embodiment is shown. The stiffening member 2 is provided with a single protrusion 11 with an opening 3 for fixing the assembly unit at the vehicle structure. The same protrusion 11 is used in this case also to fix the wrapper 7 like shown in FIG. 8 by inserting the protrusion into an opening 10 of the wrapper 7.

The wrapper 7 may also be made as a self-adhesive tape, or the like.

The invention claimed is:

1. An inflatable curtain airbag assembly comprising:
a curtain airbag selected from a group consisting of a tubular rolled airbag and a folded airbag; and
at least one stiffening member provided at the curtain airbag, the stiffening member fixed directly to the curtain airbag by a connection,
wherein the at least one stiffening member includes a planar stiffening member integrally formed of plastic and including a first portion fixed directly to the curtain airbag and a second portion defining a mounting tab for fixing the inflatable curtain airbag assembly to an interior vehicle structure.

2. The inflatable curtain airbag assembly of claim 1, wherein the connection is selected from a group consisting of an adhesive connection, a sewing connection, a welding connection and a melting connection.

3. The inflatable curtain airbag assembly according to claim 1, wherein the stiffening member includes at least in one section with a height perpendicular to a length direction of the curtain airbag which is greater than a diameter of the curtain airbag.

4. The inflatable curtain airbag assembly according to claim 3, further comprising a wrapper attached with two side rims at the stiffening member.

5. The inflatable curtain airbag assembly according to claim 4, wherein the wrapper presses the curtain airbag in an oval-shaped cross section.

6. The inflatable curtain airbag assembly according to claim 4, wherein the stiffening member includes at least one protruding section to which the wrapper is fixed.

7. The inflatable curtain airbag assembly according to claim 1, wherein the stiffening member is made of a plastic tab having a thickness of at least 0.5 mm.

8. The inflatable curtain airbag assembly according to claim 1, wherein the planar stiffening member is secured directly to an outer surface of the curtain airbag.

9. The inflatable curtain airbag assembly according to claim 1, wherein the at least one stiffening member includes a plurality of independently formed and distinct stiffening members, each stiffening member integrally formed of a flat sheet of plastic to include a mounting portion for attachment to an interior vehicle structure.

10. An inflatable curtain airbag assembly comprising:
a curtain airbag selected from a group consisting of a tubular rolled airbag and a folded airbag; and
at least one stiffening member provided at the curtain airbag, the stiffening member fixed directly to the curtain airbag by a connection,
wherein the stiffening member protrudes the curtain airbag at least in one protrusion, and the at least one protrusion of the stiffening member integrally formed with a remainder of the stiffening member and including an attachment section for fixing the inflatable curtain airbag assembly at an interior vehicle structure.

11. The inflatable curtain airbag assembly according to claim 10, wherein the stiffening member is made as a molded plastic part, and comprises an integrated molded fastener.

12. The inflatable curtain airbag assembly according to claim 10, wherein the stiffening member includes at least two projecting fingers to which a wrapper is fixed, the at least two projecting fingers arranged in a distance to each other, and wherein the protrusion for fixing the inflatable curtain airbag assembly at an interior vehicle structure is arranged between the at least two projecting fingers.

13. An inflatable curtain airbag assembly comprising:
a curtain airbag selected from a group consisting of a tubular rolled airbag and a folded airbag; and
at least two stiffening members fixed directly to the curtain airbag by a connection, the at least two stiffening members spaced apart a distance from one another, wherein the distance is smaller than 120% of a circumference or perimeter of a cross-section of the curtain airbag,
wherein the at least two stiffening members are each a flat sheet of plastic, the flat sheet of plastic sewn directly to the curtain airbag.

14. The inflatable curtain airbag assembly according to claim 13, wherein the at least two stiffening members are integrally formed to include a first portion fixed directly to the curtain airbag and a second portion defining a mounting tab for fixing the curtain airbag assembly to an interior vehicle structure.

15. The inflatable curtain airbag assembly according to claim 14, wherein the planar stiffening member is secured directly to an outer surface of the curtain airbag.

16. The inflatable curtain airbag assembly according to claim 13, wherein the at least two stiffening members include a mounting portion for attachment to an interior vehicle structure.

17. An inflatable curtain airbag assembly comprising:
a curtain airbag selected from a group consisting of a tubular rolled airbag and a folded airbag; and
at least one stiffening member provided at the curtain airbag, the stiffening member fixed directly to the curtain airbag by a connection,
wherein the at least one stiffening member is a flat sheet of plastic, the flat sheet of plastic sewn directly to the curtain airbag.

* * * * *